May 28, 1929.  O. C. REEVES  1,714,624
WEIGHING SCALE
Filed Oct. 18, 1926
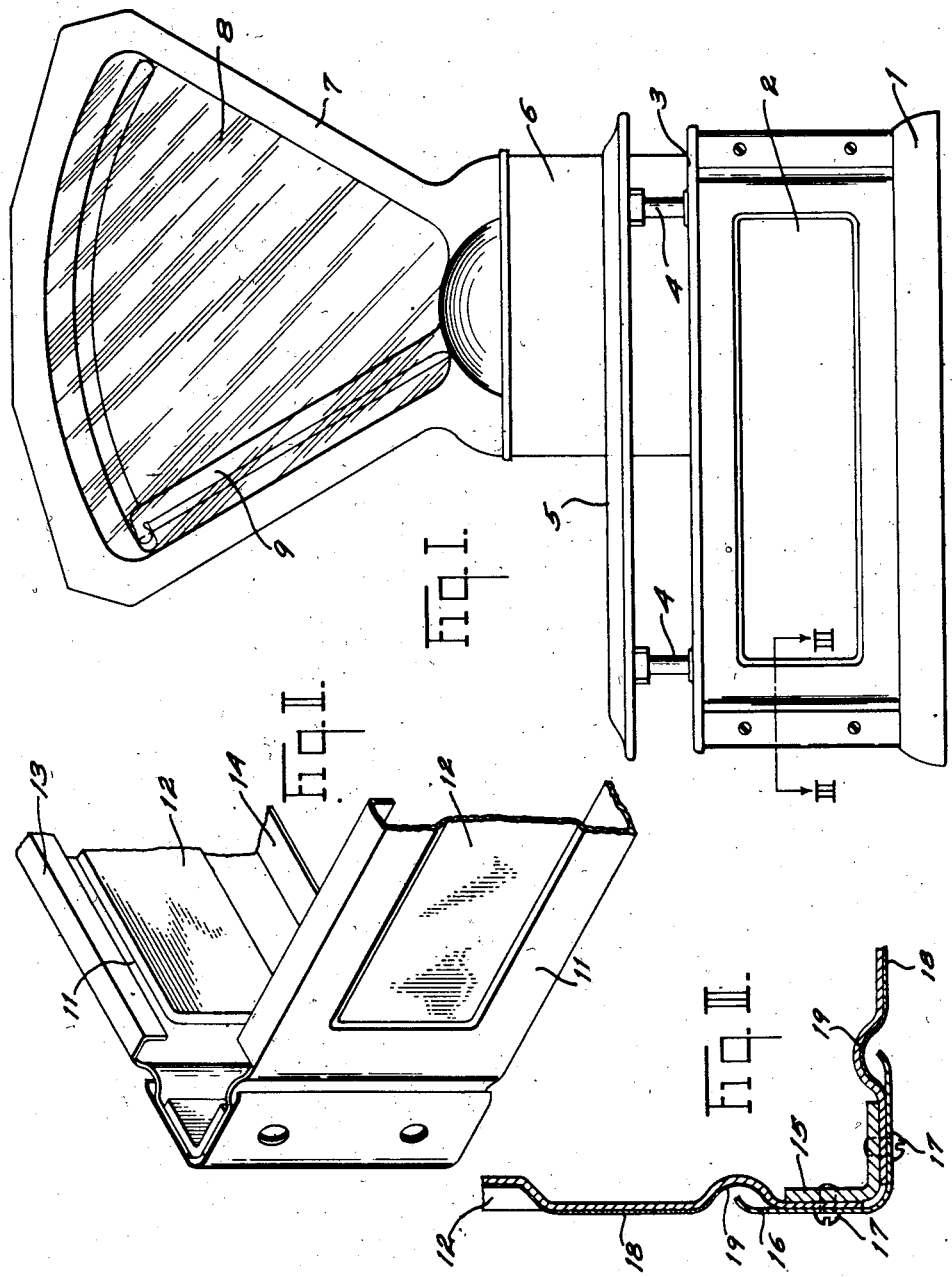
Inventor
ORWELL C. REEVES
By C. V. Marshall
Attorney Patented May 28, 1929.

1,714,624

UNITED STATES PATENT OFFICE.

ORWELL C. REEVES, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed October 18, 1926. Serial No. 142,209.

This invention relates to weighing scales, and particularly to scales of the type having sheet metal housings. In the manufacture of weighing scales constructed of sheet metal parts it is very difficult to join the several parts of a housing together and thereby secure a rigid joint and yet one that is pleasing in appearance. As it is now common practice to finish scales in porcelain enamel, one of the greatest difficulties encountered in the construction of a sheet metal scale housing is the provision of a simple means for joining the several parts of a scale housing together without chipping or otherwise damaging the porcelain enamel finish. One of the principal objects of this invention is the provision of a simple and effective means for joining the several parts of a scale housing together without danger of marring the finish.

Another object is the provision of a means for joining the sheet metal parts which will permit of the parts being rigidly connected together and yet be readily disassembled in case a replacement or repair of a part is necessary.

Another object is the provision of a sheet metal scale housing having separate side walls or panels formed substantially flat so that in finishing them in porcelain enamel a large number may be placed or stacked in a furnace and fired at one time, thus effecting a great saving of time, labor and fuel.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of a scale having a sheet metal housing and embodying my invention;

Figure II is an enlarged fragmentary isometric view of the joint forming the subject matter of my invention;

Figure III is an enlarged horizontal fragmentary sectional view taken substantially on the line III—III of Figure I.

Referring to the drawings in detail, I have shown my invention as incorporated in a scale of the fan type, but it is to be understood that my invention may be used wherever applicable. As the scale per se forms no part of my invention, I will describe it only in such detail as to show the connection of my invention thereto.

The scale consists substantially of a base plate 1 suitably supporting a substantially rectangular box-like housing 2, the construction of which forms the gist of this invention and will hereinafter be described in detail. The base housing is provided with a suitable cover 3 having openings through which project a pair of rods 4 suitably supporting a commodity-receiver 5. The rods form a part of a spider which is supported upon lever mechanism (not shown) located within the housing 2 and is operatively connected to a suitable load-counterbalancing mechanism (not shown) located within an upright housing 6 erected upon the rear of the base housing 2. The upright housing is surmounted by a fan-shaped casing 7 within which is supported a chart 8. An indicator hand 9 is connected to the load-counterbalancing mechanism and is adapted to co-operate with the chart 8 to indicate weights of loads upon the commodity-receiver 5.

The base housing 2 consists of a plurality of side walls or panels 11 which are formed with depressions 12 to impart stiffness and rigidity to them, the upper and lower edges of the panels being bent over, as at 13 and 14, to form substantially a channel-shaped member. This construction makes a side wall which is very strong and one which is not liable to warp under the intense heat treatment to which they are submitted during the porcelain enameling operation.

In joining the side walls they are first brought together at right angles and a corner bracket 15 is placed adjacent the ends of the side walls. A corner plate 16 is then fitted to the joint and is secured to the side walls and the bracket by means of screws 17, the walls of the bracket 15 having threaded openings adapted to receive the screws. In this manner the side walls are rigidly held together by means of a comparatively few screws, which may be easily removed if it becomes necessary for purposes of repair or replacement.

In the process of porcelain enameling one of the panels, the porcelain is sprayed on in the form of a fluid and the porcelain on the surface of that portion of the panel which is concealed by the corner plate 16 is preferably removed by wiping before the panels are fired in the furnace. The porcelain coating 18 shown in Figure III is terminated in transversely arranged grooves 19 in the panels. By removing this portion of the enamel coating between the plate 16 and the panels, the screws 17 may be drawn up very tight without danger of chipping or otherwise damaging the enamel finish. The edges of the corner plate 17 are slightly bent into the grooves 19 of the panels, thus providing a neat and finished appearance. The corner plates may be nickel plated to contrast favorably in appearance with the porcelain enamel finish.

It will be obvious from the above description that a joint between sheet metal parts of this kind is very desirable when the parts are finished in lacquer as well as porcelain, and provides a structure which is extremely rigid and strong, as well as light in weight.

The embodiment of my invention herein shown and described is to be regarded as illustrative only, and it is to be understood that the invention is susceptible to variation, modification and change within the spirit and scope of the subjoined claims.

Having described my invention, I claim:

1. A joint comprising a pair of metal members having overlapping portions, one of said members being provided with a groove, the other of said members having a turned edge lying within said groove but out of engagement therewith, the surface of said grooved member within and beyond said groove being coated with vitreous enamel, and means for securing said members together.

2. A structural corner comprising a corner member and a pair of side members, said corner member overlapping each of said side members, the overlapping portions of said members being provided one with a groove, the other with a turned edge extending into said groove but out of engagement therewith, and means for securing said corner and side members together.

3. A structural corner comprising a corner member and a pair of side members, said corner member overlapping each of said side members, the overlapping portions of said members being provided one with a groove, the other with a turned edge extending into said groove but out of engagement therewith, the unengaged surfaces of said side members being coated with vitreous enamel, and means for securing said corner and side members together.

4. In a structural corner, an inner and an outer corner member, side members having portions lying between said inner and outer corner members, said side members being provided with grooves, said outer corner member being provided with turned edges lying within said groove but out of engagement therewith, and means for securing said corner and side members together.

5. In a structural corner, an inner and an outer corner member, side members having portions lying between said inner and outer corner members, said side members being provided with grooves, said outer corner member being provided with turned edges lying within said groove but out of engagement therewith, the unengaged portions of said side members being coated with vitreous enamel, and means for securing said corner and side members together.

6. A housing for weighing scales including sheet metal side members and sheet metal corner pieces, said side members and corner pieces having overlapping portions, said side members being provided with grooves and said corner pieces being provided with turned edges extending into but out of engagement with said groove.

7. A housing for weighing scales including sheet metal side members and sheet metal corner pieces, said side members and corner pieces having overlapping portions, said side members being provided with grooves and said corner pieces being provided with turned edges extending into but out of engagement with said groove, the unengaged portions of said side members being coated with vitreous enamel.

ORWELL C. REEVES.